US010922878B2

United States Patent
Neulander et al.

(10) Patent No.: US 10,922,878 B2
(45) Date of Patent: Feb. 16, 2021

(54) LIGHTING FOR INSERTED CONTENT

(71) Applicant: GOOGLE LLC, Mountain View, CA (US)

(72) Inventors: Ivan Neulander, Los Angeles, CA (US); Chloe LeGendre, Playa Vista, CA (US); Paul Debevec, Culver City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/151,276

(22) Filed: Oct. 3, 2018

(65) Prior Publication Data

US 2019/0102936 A1    Apr. 4, 2019

Related U.S. Application Data

(60) Provisional application No. 62/568,116, filed on Oct. 4, 2017.

(51) Int. Cl.
*G06T 15/80* (2011.01)
*G06T 7/70* (2017.01)
(Continued)

(52) U.S. Cl.
CPC .......... *G06T 15/80* (2013.01); *G02B 27/0172* (2013.01); *G06T 3/40* (2013.01);
(Continued)

(58) Field of Classification Search
CPC ... G06T 11/60; G06T 7/74; G06T 7/75; G06T 7/97; G06T 2215/12; G06T 15/50; G06T 7/586; G06T 15/506; G06T 15/60; G06T 15/80; G06T 19/006; G06T 19/20; G06T 7/11; G06T 2215/16; G06T 7/70;
(Continued)

(56) References Cited

U.S. PATENT DOCUMENTS 5,742,749 A * 4/1998 Foran .............. G06T 15/50
345/426
5,870,097 A * 2/1999 Snyder ............. G06T 11/001
345/422

(Continued)

OTHER PUBLICATIONS

International Search Report and Written Opinion for International Application No. PCT/US2018/054313, dated Feb. 7, 2019, 22 pages.
(Continued)

*Primary Examiner* — Charles L Beard
(74) *Attorney, Agent, or Firm* — Brake Hughes Bellermann LLP

(57) ABSTRACT

Systems and methods for lighting inserted content are provided. For example, the inserted content may include augmented reality content that is inserted into an image of a physical space. An example system and method may include determining a location within an image to insert content. For example, the image may be captured by a camera device. The example system and method may also include identifying a region of the image based on the determined location to insert the content, determining at least one lighting parameter based on the identified region, and rendering the content using the determined at least one lighting parameter.

15 Claims, 8 Drawing Sheets

(51) Int. Cl.
　　　*G06T 7/40*　　　　(2017.01)
　　　*G06T 3/40*　　　　(2006.01)
　　　*G06T 15/00*　　　(2011.01)
　　　*G06T 15/04*　　　(2011.01)
　　　*G06T 19/00*　　　(2011.01)
　　　*G02B 27/01*　　　(2006.01)
　　　*G06T 7/11*　　　　(2017.01)
　　　*H04N 13/106*　　(2018.01)
　　　*H04N 5/272*　　　(2006.01)
　　　*G06T 5/40*　　　　(2006.01)
　　　*G06T 15/50*　　　(2011.01)

(52) U.S. Cl.
　　　CPC .................. *G06T 5/40* (2013.01); *G06T 7/11*
　　　　　(2017.01); *G06T 7/40* (2013.01); *G06T 7/70*
　　　　　(2017.01); *G06T 15/005* (2013.01); *G06T*
　　　　*15/04* (2013.01); *G06T 15/50* (2013.01); *G06T*
　　　　　　*19/006* (2013.01); *H04N 5/272* (2013.01);
　　　　　　　　　　　　　　　*H04N 13/106* (2018.05)

(58) Field of Classification Search
　　　CPC .... G06T 3/40; G06T 5/40; G06T 7/40; G06T
　　　　　　　15/005; G06T 15/04; G02B 27/017;
　　　　　　　G02B 27/0172; G02B 2027/0174; H04N
　　　　　　　　　　　　　　　5/272; H04N 13/106
　　　See application file for complete search history.

(56) References Cited

U.S. PATENT DOCUMENTS

| | | | | |
|---|---|---|---|---|
| 7,920,753 B2* | 4/2011 | Wang | ................ | G06K 9/228 |
| | | | | 382/254 |
| 8,139,059 B2* | 3/2012 | Trepte | ................ | G06T 15/60 |
| | | | | 345/426 |
| 8,243,061 B2* | 8/2012 | Matsumura | ............ | G06T 15/60 |
| | | | | 345/419 |
| 8,698,902 B2* | 4/2014 | Kawamoto | ........... | G06T 19/006 |
| | | | | 348/207.1 |
| 8,872,853 B2* | 10/2014 | Sugden | .............. | G06F 3/04815 |
| | | | | 345/633 |
| 9,135,513 B2* | 9/2015 | Takemoto | ................ | G06K 9/32 |
| 9,153,202 B2* | 10/2015 | Morinaga | ................ | G09G 5/02 |
| 9,171,388 B2* | 10/2015 | Morinaga | ........... | G06F 3/04815 |
| 9,311,751 B2* | 4/2016 | Lamb | ................ | G09G 3/003 |
| 9,338,447 B1* | 5/2016 | Crump | ................ | G06T 7/80 |
| 9,367,203 B1* | 6/2016 | Costello | ............... | G06F 1/1686 |
| 9,384,548 B1* | 7/2016 | Wahrenberg | ........... | G06T 15/08 |
| 9,392,212 B1* | 7/2016 | Ross | .................. | G11B 27/005 |
| 9,418,629 B2* | 8/2016 | Calian | ................ | G06T 15/04 |
| 9,429,912 B2* | 8/2016 | Fleck | ............... | G03H 1/2249 |
| 9,524,585 B2* | 12/2016 | Steed | ............... | G06T 15/50 |
| 9,530,243 B1* | 12/2016 | Costello | ............... | G06T 15/503 |
| 9,613,454 B2* | 4/2017 | Karsch | .............. | G06T 15/50 |
| 9,659,398 B2* | 5/2017 | Liou | ................. | G06T 13/80 |
| 9,721,389 B2* | 8/2017 | Holmquist | ........... | G06T 19/006 |
| 9,724,609 B2* | 8/2017 | Kochi | ................. | G06T 19/006 |
| 9,734,634 B1* | 8/2017 | Mott | ................... | G06T 19/006 |
| 10,055,028 B2* | 8/2018 | Toff | ................... | G06F 3/0346 |
| 10,055,887 B1* | 8/2018 | Gil | ...................... | G06T 19/006 |
| 10,127,725 B2* | 11/2018 | Kohler | .............. | G06T 19/006 |
| 10,140,754 B1* | 11/2018 | Voris | .................. | G06T 15/506 |
| 10,210,618 B1* | 2/2019 | Kuffner | .................. | G06T 7/11 |
| 10,210,664 B1* | 2/2019 | Chaturvedi | ............. | G06T 19/20 |
| 10,217,195 B1* | 2/2019 | Agrawal | ................ | G06T 7/194 |
| 10,275,938 B2* | 4/2019 | Kondo | .................. | G06F 3/0481 |
| 10,339,721 B1* | 7/2019 | Dascola | ................ | G06F 1/1694 |
| 10,348,932 B2* | 7/2019 | Ichihashi | .............. | G06K 9/4652 |
| 10,378,877 B2* | 8/2019 | Nagano | ................... | G06T 3/00 |
| 10,380,803 B1* | 8/2019 | Jaafar | .................. | G06T 19/20 |
| 10,403,013 B2* | 9/2019 | Heo | ..................... | G06K 9/4652 |
| 10,403,045 B2* | 9/2019 | Corazza | .............. | G06T 15/503 |
| 10,438,404 B2* | 10/2019 | Trowbridge | .......... | G06T 19/006 |
| 10,559,121 B1* | 2/2020 | Moudgil | ............... | G06T 15/50 |
| 10,598,929 B2* | 3/2020 | Teller | ................. | G02B 27/14 |
| 10,607,403 B2* | 3/2020 | Neulander | ............ | G06T 15/005 |
| 10,607,415 B2* | 3/2020 | Leung | ..................... | G06T 7/73 |
| 10,607,567 B1* | 3/2020 | Schritter | ............... | G06T 15/506 |
| 2002/0118019 A1* | 8/2002 | Nomura | ..................... | G06T 5/20 |
| | | | | 324/509 |
| 2003/0080978 A1* | 5/2003 | Navab | ..................... | G01S 5/16 |
| | | | | 345/633 |
| 2003/0128207 A1* | 7/2003 | Sawada | ................. | G06T 7/514 |
| | | | | 345/419 |
| 2003/0156117 A1* | 8/2003 | Higuchi | .................. | G06T 15/04 |
| | | | | 345/582 |
| 2004/0056859 A1* | 3/2004 | Ohba | ........................ | G06T 15/02 |
| | | | | 345/426 |
| 2005/0008243 A1* | 1/2005 | Fujino | .................... | G03G 15/50 |
| | | | | 382/254 |
| 2005/0041023 A1* | 2/2005 | Green | ...................... | G06T 15/04 |
| | | | | 345/426 |
| 2006/0170681 A1* | 8/2006 | Ohba | ........................ | G06T 15/04 |
| | | | | 345/426 |
| 2006/0187232 A1* | 8/2006 | Kempf | ...................... | G09G 5/04 |
| | | | | 345/591 |
| 2007/0038944 A1* | 2/2007 | Carignano | .............. | G06T 15/20 |
| | | | | 715/757 |
| 2007/0211069 A1* | 9/2007 | Baker | ...................... | G06T 15/80 |
| | | | | 345/587 |
| 2007/0236485 A1* | 10/2007 | Trepte | ..................... | G06T 15/60 |
| | | | | 345/207 |
| 2008/0071559 A1* | 3/2008 | Arrasvuori | ............ | G06T 19/006 |
| | | | | 705/26.1 |
| 2008/0194323 A1* | 8/2008 | Merkli | ..................... | A63F 13/02 |
| | | | | 463/30 |
| 2008/0211813 A1* | 9/2008 | Jamwal | .................. | G01J 1/1626 |
| | | | | 345/426 |
| 2009/0033661 A1* | 2/2009 | Miller | ..................... | G06T 15/60 |
| | | | | 345/426 |
| 2009/0034874 A1* | 2/2009 | Miller | ..................... | G06T 15/50 |
| | | | | 382/279 |
| 2009/0109221 A1* | 4/2009 | Planck | .................. | G06T 15/506 |
| | | | | 345/426 |
| 2009/0109240 A1* | 4/2009 | Englert | .................. | G06T 19/006 |
| | | | | 345/633 |
| 2009/0115784 A1* | 5/2009 | Tomite | .................... | G06T 15/06 |
| | | | | 345/426 |
| 2010/0045869 A1* | 2/2010 | Baseley | .................. | G06T 19/00 |
| | | | | 348/598 |
| 2010/0066750 A1* | 3/2010 | Yu | ........................... | H04L 51/38 |
| | | | | 345/581 |
| 2010/0079426 A1* | 4/2010 | Pance | ..................... | G06T 11/001 |
| | | | | 345/207 |
| 2010/0103172 A1* | 4/2010 | Purdy, Sr. | ............... | G06T 15/50 |
| | | | | 345/426 |
| 2010/0289817 A1* | 11/2010 | Meier | ..................... | G06T 15/20 |
| | | | | 345/619 |
| 2010/0295851 A1* | 11/2010 | Diamond | ............... | G06T 15/405 |
| | | | | 345/422 |
| 2011/0025878 A1* | 2/2011 | Dalton | .................... | H04N 9/735 |
| | | | | 348/223.1 |
| 2011/0063295 A1* | 3/2011 | Kuo | ....................... | G06T 15/50 |
| | | | | 345/426 |
| 2011/0090343 A1* | 4/2011 | Alt | ......................... | G06T 19/006 |
| | | | | 348/164 |
| 2011/0157017 A1* | 6/2011 | Webb | ........................ | A63F 13/06 |
| | | | | 345/158 |
| 2011/0157402 A1* | 6/2011 | Kitajima | ................ | H04N 5/142 |
| | | | | 348/222.1 |
| 2011/0169861 A1* | 7/2011 | Suzuki | .................. | G06T 19/006 |
| | | | | 345/632 |
| 2011/0234631 A1* | 9/2011 | Kim | ....................... | G06T 15/60 |
| | | | | 345/632 |
| 2012/0086729 A1* | 4/2012 | Baseley | ................... | G06F 3/011 |
| | | | | 345/633 |
| 2012/0092328 A1* | 4/2012 | Flaks | ..................... | G02B 27/017 |
| | | | | 345/419 |
| 2012/0093418 A1* | 4/2012 | Kim | ....................... | G06T 11/60 |
| | | | | 382/195 |

(56) References Cited

U.S. PATENT DOCUMENTS

| | | | |
|---|---|---|---|
| 2012/0113141 A1* | 5/2012 | Zimmerman | G06Q 30/0643 345/633 |
| 2012/0206452 A1* | 8/2012 | Geisner | H04S 7/304 345/419 |
| 2012/0229430 A1* | 9/2012 | Ward | G09G 3/002 345/204 |
| 2012/0249741 A1* | 10/2012 | Maciocci | G06F 3/011 348/46 |
| 2013/0002698 A1* | 1/2013 | Geiger | G06T 15/00 345/589 |
| 2013/0100165 A1* | 4/2013 | Komiyama | G09G 5/397 345/634 |
| 2013/0106910 A1* | 5/2013 | Sacco | G06T 19/006 345/633 |
| 2013/0117377 A1* | 5/2013 | Miller | G06F 3/013 709/205 |
| 2013/0124326 A1* | 5/2013 | Huang | G06Q 30/0255 705/14.64 |
| 2013/0141434 A1* | 6/2013 | Sugden | G02B 27/017 345/426 |
| 2013/0147826 A1* | 6/2013 | Lamb | G02B 27/017 345/589 |
| 2013/0201217 A1* | 8/2013 | Morinaga | G06F 3/04815 345/633 |
| 2013/0208014 A1* | 8/2013 | Fleck | G06K 9/00684 345/672 |
| 2013/0300767 A1* | 11/2013 | Kochi | G06T 19/006 345/633 |
| 2013/0321675 A1* | 12/2013 | Cote | H04N 9/64 348/242 |
| 2013/0322753 A1* | 12/2013 | Lim | G06T 5/001 382/167 |
| 2013/0342564 A1* | 12/2013 | Kinnebrew | G09G 3/003 345/619 |
| 2014/0002472 A1* | 1/2014 | Sobeski | G09G 5/026 345/582 |
| 2014/0125668 A1* | 5/2014 | Steed | G06T 15/50 345/426 |
| 2014/0132484 A1* | 5/2014 | Pandey | G06T 19/006 345/8 |
| 2014/0204002 A1* | 7/2014 | Bennet | G06F 3/011 345/8 |
| 2014/0210822 A1* | 7/2014 | Raley | G06T 15/80 345/426 |
| 2014/0225916 A1* | 8/2014 | Theimer | G06T 19/006 345/633 |
| 2014/0267412 A1* | 9/2014 | Calian | G09G 5/377 345/633 |
| 2014/0282220 A1* | 9/2014 | Wantland | G06F 3/04845 715/782 |
| 2014/0292645 A1* | 10/2014 | Tsurumi | G06F 3/011 345/156 |
| 2014/0306866 A1* | 10/2014 | Miller | G06T 7/73 345/8 |
| 2014/0320519 A1* | 10/2014 | Sorkine Hornung | H04N 1/6077 345/591 |
| 2014/0327688 A1* | 11/2014 | Lassen | G06T 1/60 345/552 |
| 2014/0340418 A1* | 11/2014 | Matsumoto | H04N 9/67 345/590 |
| 2014/0343699 A1* | 11/2014 | Engelen | G06T 15/506 700/90 |
| 2014/0368521 A1* | 12/2014 | Lassen | G06T 1/60 345/552 |
| 2014/0375639 A1* | 12/2014 | Kwon | G06T 15/50 345/426 |
| 2015/0029223 A1* | 1/2015 | Kaino | G06T 19/006 345/633 |
| 2015/0035832 A1* | 2/2015 | Sugden | G02B 27/017 345/426 |
| 2015/0062120 A1* | 3/2015 | Reisner-Kollmann | G06T 17/00 345/419 |
| 2015/0070153 A1* | 3/2015 | Bhatia | G06F 3/016 340/407.1 |
| 2015/0078441 A1* | 3/2015 | Han | H04N 19/124 375/240.03 |
| 2015/0091903 A1* | 4/2015 | Costello | G06T 15/20 345/426 |
| 2015/0123966 A1* | 5/2015 | Newman | G06T 19/006 345/419 |
| 2015/0139533 A1* | 5/2015 | Wu | G06K 9/00362 382/154 |
| 2015/0146972 A1* | 5/2015 | Lalonde | G06K 9/4661 382/155 |
| 2015/0187128 A1* | 7/2015 | Jones | G06T 15/60 345/426 |
| 2015/0221097 A1* | 8/2015 | Yu | G06T 7/90 382/165 |
| 2015/0221134 A1* | 8/2015 | Koga | G06T 19/006 345/633 |
| 2015/0279113 A1* | 10/2015 | Knorr | G06T 7/11 345/633 |
| 2015/0301592 A1* | 10/2015 | Miller | G06F 3/016 345/156 |
| 2015/0332508 A1* | 11/2015 | Jovanovic | G06T 15/20 345/427 |
| 2015/0355521 A1* | 12/2015 | Alton | G02F 1/167 250/214 AL |
| 2015/0358613 A1* | 12/2015 | Sandrew | G06T 15/205 348/36 |
| 2016/0026253 A1* | 1/2016 | Bradski | H04N 13/344 345/8 |
| 2016/0080732 A1* | 3/2016 | Pedley | G02B 27/0172 345/8 |
| 2016/0092080 A1* | 3/2016 | Swanson | G06F 3/04845 345/654 |
| 2016/0125656 A1* | 5/2016 | James | G06T 7/60 345/633 |
| 2016/0148432 A1* | 5/2016 | Hattingh | G06T 19/00 345/426 |
| 2016/0148433 A1* | 5/2016 | Petrovskaya | G06T 19/006 345/633 |
| 2016/0170702 A1* | 6/2016 | Jiang | G02F 1/133528 345/618 |
| 2016/0187199 A1* | 6/2016 | Brunk | G01J 3/2823 348/89 |
| 2016/0189426 A1* | 6/2016 | Thomas | G06T 19/006 345/633 |
| 2016/0239992 A1* | 8/2016 | Heo | G06T 11/60 |
| 2016/0255320 A1* | 9/2016 | Shintani | H04N 1/6027 348/239 |
| 2016/0260261 A1* | 9/2016 | Hsu | B23K 9/173 |
| 2016/0267634 A1* | 9/2016 | Nam | G06T 11/60 |
| 2016/0292924 A1* | 10/2016 | Balachandreswaran | G06T 19/006 |
| 2016/0329006 A1* | 11/2016 | Weber | G06F 3/011 |
| 2016/0335795 A1* | 11/2016 | Flynn | G06T 15/20 |
| 2016/0350967 A1* | 12/2016 | Klassen | G06T 15/60 |
| 2016/0360167 A1* | 12/2016 | Mitchell | H04N 9/3194 |
| 2016/0364914 A1* | 12/2016 | Todeschini | G06T 19/006 |
| 2016/0371398 A1* | 12/2016 | Sugiura | B33Y 30/00 |
| 2016/0379418 A1* | 12/2016 | Osborn | G06T 19/20 345/589 |
| 2017/0061681 A1* | 3/2017 | Engel | G06T 15/506 |
| 2017/0061843 A1* | 3/2017 | Zhao | G09G 3/2003 |
| 2017/0076142 A1* | 3/2017 | Chang | G06T 7/90 |
| 2017/0090194 A1* | 3/2017 | Hayes | G06T 19/006 |
| 2017/0108838 A1* | 4/2017 | Todeschini | G05B 15/02 |
| 2017/0116737 A1* | 4/2017 | Imber | G06T 7/90 |
| 2017/0116754 A1* | 4/2017 | Imber | G06T 7/90 |
| 2017/0116778 A1* | 4/2017 | Lee | G06T 15/506 |
| 2017/0132845 A1* | 5/2017 | Everman, II | G06F 3/017 |
| 2017/0178364 A1* | 6/2017 | Needham | G06T 19/006 |
| 2017/0178397 A1* | 6/2017 | Hillesland | G06T 15/80 |
| 2017/0200312 A1* | 7/2017 | Smith | G06T 19/006 |
| 2017/0206712 A1* | 7/2017 | Petrovskaya | G06T 19/006 |

(56) References Cited

U.S. PATENT DOCUMENTS

| | | | |
|---|---|---|---|
| 2017/0243352 A1* | 8/2017 | Kutliroff | G06T 7/10 |
| 2017/0244908 A1* | 8/2017 | Flack | G06K 9/00234 |
| 2017/0251538 A1* | 8/2017 | Green | H05B 37/029 |
| 2017/0263047 A1* | 9/2017 | Mima | G06T 15/506 |
| 2017/0270715 A1* | 9/2017 | Lindsay | G06F 3/011 |
| 2017/0277256 A1* | 9/2017 | Burns | G06F 3/013 |
| 2017/0278289 A1* | 9/2017 | Marino | G06K 9/00765 |
| 2017/0280971 A1* | 10/2017 | Makino | A61B 1/00009 |
| 2017/0295355 A1* | 10/2017 | Tanaka | G06T 7/593 |
| 2017/0318178 A1* | 11/2017 | Debevec | H04N 1/0284 |
| 2017/0336941 A1* | 11/2017 | Gribetz | G06F 3/04815 |
| 2017/0345185 A1* | 11/2017 | Byron | G06T 7/11 |
| 2018/0003966 A1* | 1/2018 | Kilcher | G02B 5/208 |
| 2018/0012379 A1* | 1/2018 | Hong | G06T 11/001 |
| 2018/0012392 A1* | 1/2018 | Kryachko | G06T 15/005 |
| 2018/0025521 A1* | 1/2018 | Allen | G06T 11/001 345/589 |
| 2018/0033195 A1* | 2/2018 | Nagano | G06T 17/20 |
| 2018/0034932 A1* | 2/2018 | Miranda-Steiner | H04L 67/16 |
| 2018/0040156 A1* | 2/2018 | Kondo | G06F 3/0354 |
| 2018/0040161 A1* | 2/2018 | Tierney | G06F 3/015 |
| 2018/0077409 A1* | 3/2018 | Heo | H04N 13/122 |
| 2018/0082455 A1* | 3/2018 | Yamaji | G06T 11/60 |
| 2018/0088323 A1* | 3/2018 | Bao | G02B 27/0093 |
| 2018/0096523 A1* | 4/2018 | Zhou | G06T 15/506 |
| 2018/0106600 A1* | 4/2018 | Greenspan | H04N 5/341 |
| 2018/0114353 A1* | 4/2018 | Champion | G06T 19/006 |
| 2018/0114372 A1* | 4/2018 | Nagy | G06F 3/04842 |
| 2018/0140942 A1* | 5/2018 | Miller | A63F 13/211 |
| 2018/0167547 A1* | 6/2018 | Casey | G05B 15/02 |
| 2018/0182160 A1* | 6/2018 | Boulton | G06T 15/506 |
| 2018/0188536 A1* | 7/2018 | Bell | G02B 27/0093 |
| 2018/0188538 A1* | 7/2018 | Bell | G02F 1/133528 |
| 2018/0192160 A1* | 7/2018 | Ravindran | H04N 21/812 |
| 2018/0211440 A1* | 7/2018 | Kunkel | G06T 19/006 |
| 2018/0211446 A1* | 7/2018 | Robert | G06T 19/20 |
| 2018/0225032 A1* | 8/2018 | Jones | G06K 9/00456 |
| 2018/0286080 A1* | 10/2018 | Marshall | G02B 27/017 |
| 2018/0300952 A1* | 10/2018 | Evans | G06T 19/006 |
| 2018/0314066 A1* | 11/2018 | Bell | G09G 5/10 |
| 2018/0330544 A1* | 11/2018 | Corso | G06K 9/00671 |
| 2018/0332268 A1* | 11/2018 | Xiao | H04N 13/332 |
| 2018/0343432 A1* | 11/2018 | Duan | G01S 7/497 |
| 2018/0350032 A1* | 12/2018 | Bastani | G06T 3/0093 |
| 2018/0365897 A1* | 12/2018 | Pahud | G06T 19/006 |
| 2019/0026905 A1* | 1/2019 | Siegemund | G06T 7/248 |
| 2019/0051039 A1* | 2/2019 | Tsuru | A61B 1/05 |
| 2019/0051052 A1* | 2/2019 | Corazza | G06T 15/60 |
| 2019/0057550 A1* | 2/2019 | Aurongzeb | G06T 19/006 |
| 2019/0065027 A1* | 2/2019 | Hauenstein | G06F 3/011 |
| 2019/0066315 A1* | 2/2019 | Bleyer | G06T 7/49 |
| 2019/0068853 A1* | 2/2019 | Price | G06T 7/521 |
| 2019/0073747 A1* | 3/2019 | Burch | G06T 3/4092 |
| 2019/0080498 A1* | 3/2019 | Horie | H04N 5/272 |
| 2019/0088004 A1* | 3/2019 | Lucas | G06K 9/6202 |
| 2019/0094981 A1* | 3/2019 | Bradski | G02B 27/0093 |
| 2019/0102934 A1* | 4/2019 | Neulander | G06T 7/70 |
| 2019/0102935 A1* | 4/2019 | Neulander | G02B 27/0172 |
| 2019/0108672 A1* | 4/2019 | Ghelberg | G06T 15/10 |
| 2019/0114795 A1* | 4/2019 | Rajvanshi | G06T 7/55 |
| 2019/0114828 A1* | 4/2019 | Trowbridge | G06T 15/80 |
| 2019/0122441 A1* | 4/2019 | Agrawal | G03B 21/00 |
| 2019/0130544 A1* | 5/2019 | Kitajima | H04N 5/232 |
| 2019/0164335 A1* | 5/2019 | Sheffield | G06T 15/20 |
| 2019/0188913 A1* | 6/2019 | Cho | H05B 37/0245 |
| 2019/0204600 A1* | 7/2019 | Ha | G02B 6/0035 |
| 2019/0204601 A1* | 7/2019 | Ha | G02B 27/0172 |
| 2019/0273912 A1* | 9/2019 | Ward | G09G 3/002 |
| 2019/0287495 A1* | 9/2019 | Mathur | G06T 11/00 |
| 2019/0293939 A1* | 9/2019 | Sluka | G02B 27/0075 |
| 2019/0297316 A1* | 9/2019 | Bleyer | G06T 15/04 |
| 2019/0311467 A1* | 10/2019 | Neulander | G06T 5/009 |
| 2019/0311471 A1* | 10/2019 | Kurabayashi | G06T 7/0002 |
| 2019/0325640 A1* | 10/2019 | Jiddi | G06T 17/00 |
| 2019/0369836 A1* | 12/2019 | Faulkner | G06T 7/50 |
| 2020/0027201 A1* | 1/2020 | Chen | G06T 5/008 |
| 2020/0074724 A1* | 3/2020 | Mathur | G02B 27/0172 |
| 2020/0201026 A1* | 6/2020 | Curtis | G02B 27/4205 |
| 2020/0201428 A1* | 6/2020 | Yoon | G02B 27/01 |
| 2020/0225737 A1* | 7/2020 | Limor | G06T 15/60 |
| 2020/0226823 A1* | 7/2020 | Stachniak | G06T 19/20 |
| 2020/0268127 A1* | 8/2020 | Yang | A47G 1/04 |

OTHER PUBLICATIONS

Invitation to Pay Additional Fees for International Application No. PCT/US2018/054313, mailed Dec. 12, 2018, 20 pages.

Burke, David, et al., "Bidirectional Importance Sampling for Direct Illumination", Eurographics Symposium on Rendering, 2005, 11 pages.

Rohmer, Kai, et at, "Interactive Near-Field Illumination for Photo-realistic Augmented Reality on Mobile Devices", IEEE VGTC, Sep. 10-12, 2014, 10 pages.

Unterguggenberger, Johannes, "Realistic Rendering in Mobile Augmented Reality", Vienna University of Technology, Faculty of Informatics, Diploma Thesis, Oct. 5, 2016, 123 pages.

* cited by examiner

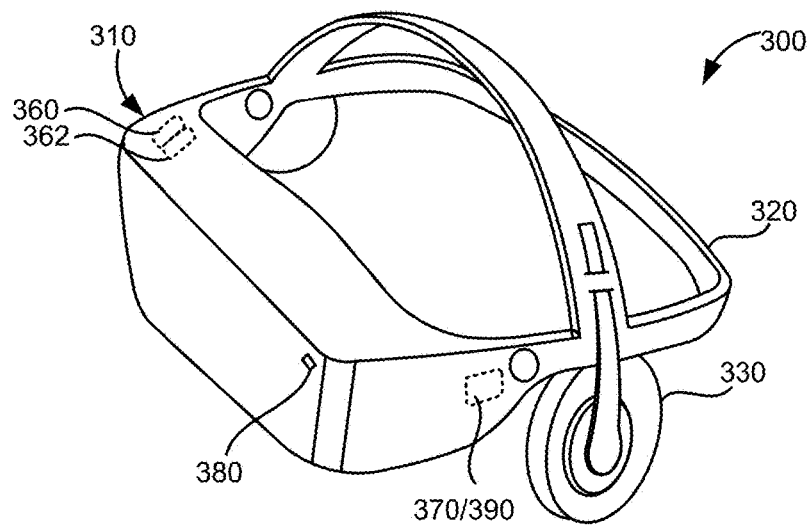
FIG. 3A
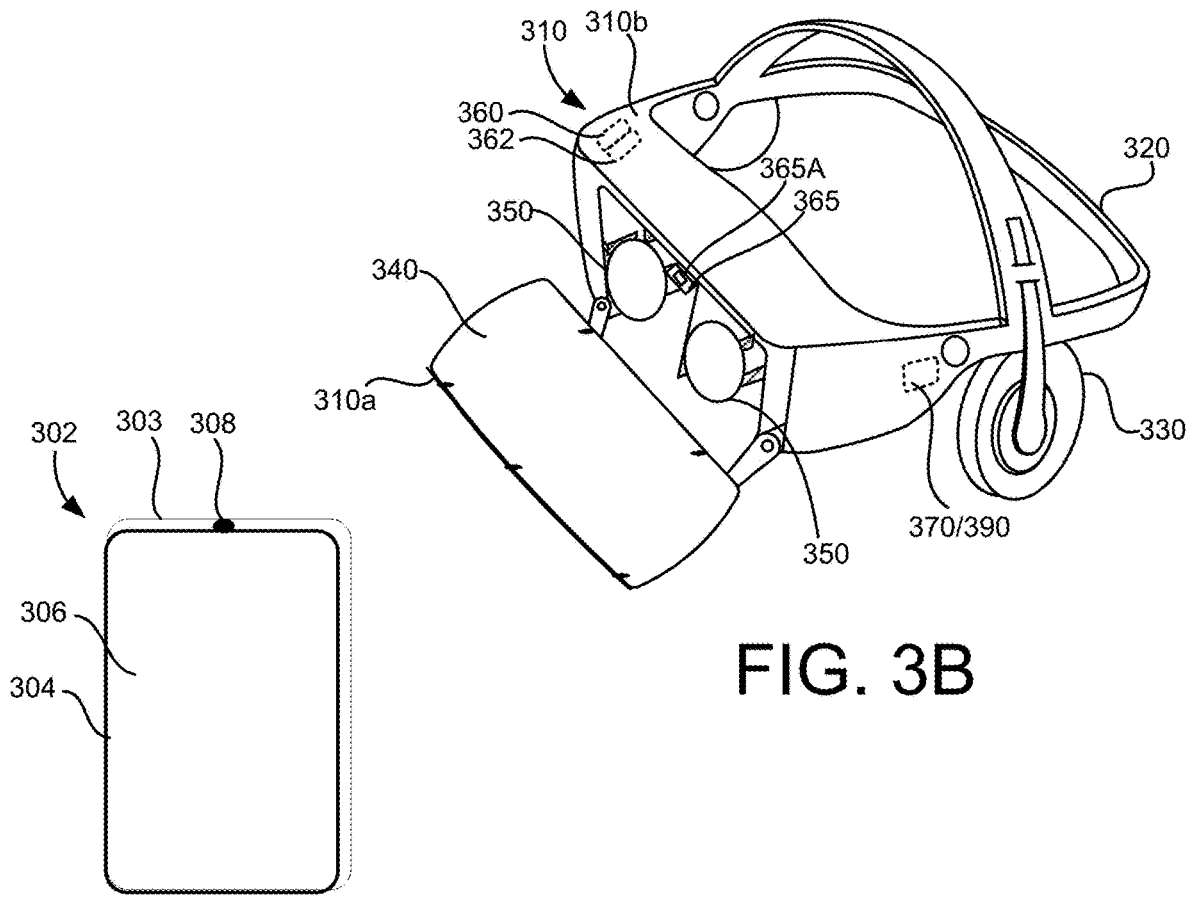
FIG. 3B
FIG. 3C

LIGHTING FOR INSERTED CONTENT

CROSS-REFERENCE TO RELATED APPLICATION

This application claims priority to U.S. Application No. 62/568,116, filed on Oct. 4, 2017, the disclosure of which is incorporated herein by reference in its entirety.

BACKGROUND

Content may be inserted into an image or a user's field of view. For example, an augmented reality (AR) system may generate an immersive augmented environment for a user by inserting content. The immersive augmented environment can be generated by superimposing computer-generated content on a user's field of view of the real world. For example, the computer-generated content can include labels, textual information, images, sprites, and three-dimensional entities. These images may be displayed at a position in the user's field of view so as to appear to overlay an object in the real world. Similarly, the computer-generated content may be overlaid on a displayed image. The lighting applied to the inserted content may impact how well the inserted content fits with the rest of the image.

SUMMARY

This disclosure describes systems and methods for lighting inserted content. For example, the inserted content may include augmented reality content that is inserted into an image of a physical space.

In one aspect, an example method may include determining a location within an image to insert content. For example, the image may be captured by a camera device. The example method may also include identifying a region of the image based on the determined location to insert the content, determining at least one lighting parameter based on the identified region, and rendering the content using the determined at least one lighting parameter.

In another aspect, an example method includes capturing an image. The image may be captured by a camera assembly of a portable computing device. The method may also include determining a location within the image to insert content and identifying a first region of the image based on a projection of the determined location onto an image plane. The method may further include extracting first image properties from the first region of the image and determining an upper lighting parameter based on the first image properties. The method may also include identifying a second region of the image based on a projection of the determined location onto an image plane, extracting second image properties from the second region of the image, and determining a lower lighting parameter based on the second image properties. The method may also include rendering the content using the determined upper lighting parameter and lower lighting parameter.

In yet another aspect, a system comprising: a camera; at least one processor; and memory storing instructions that, when executed by the at least one processor, cause the system to: capture an image; determine a location within the image to insert content; identify a region of the image based on the determined location to insert the content; determine at least one lighting parameter based on the identified region; render the content using the determined at least one lighting parameter; insert the rendered content into the image to generate an augmented image; and cause the augmented image to be displayed.

The details of one or more implementations are set forth in the accompanying drawings and the description below. Other features will be apparent from the description and drawings, and from the claims.

BRIEF DESCRIPTION OF THE DRAWINGS

FIGS. 3A, 3B, and 3C are diagrams depicting an example head-mounted display device and controller, in accordance with implementations as described herein.

DETAILED DESCRIPTION

Figure 1:
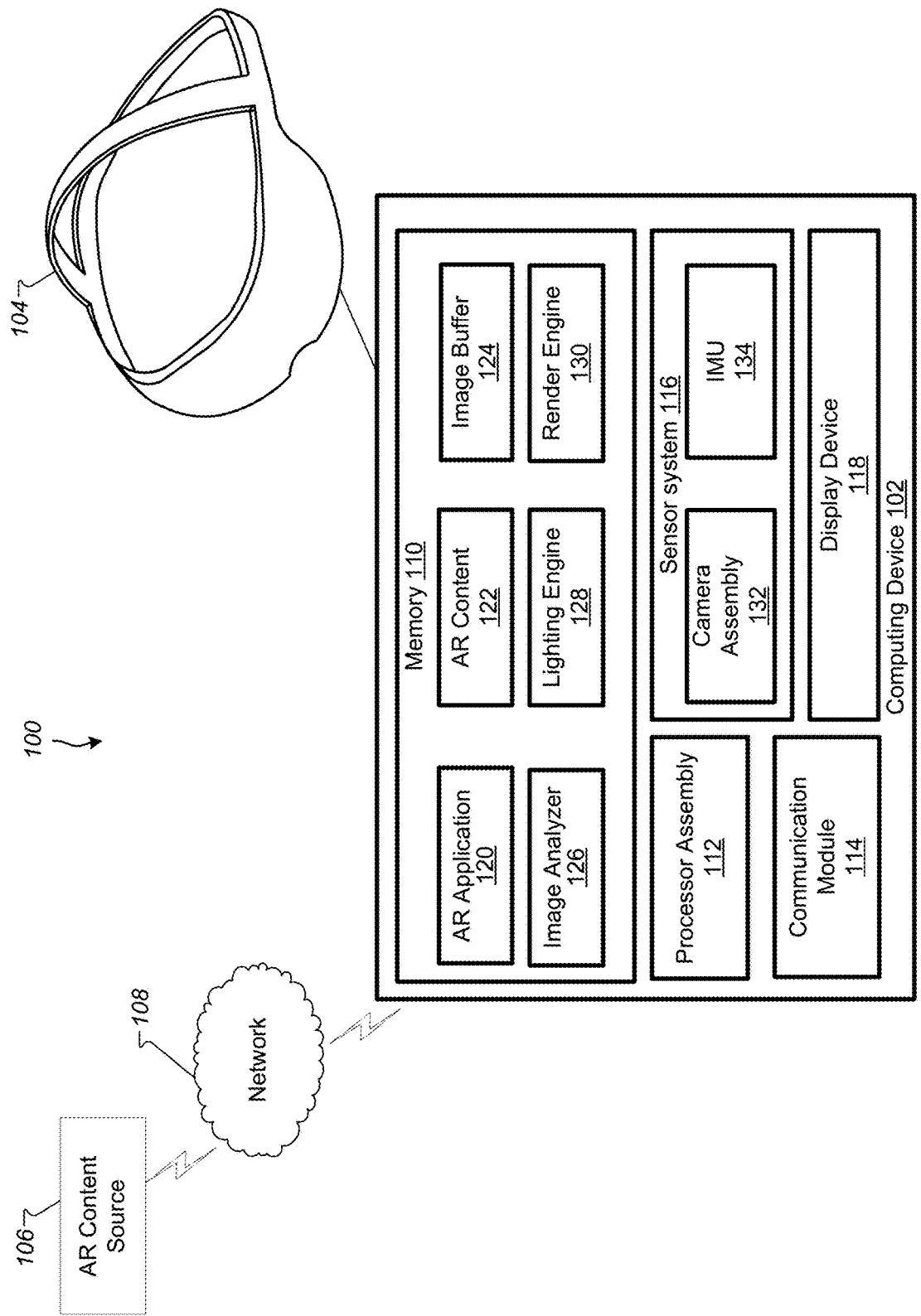
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Augmented reality (AR) systems include systems that insert computer-generated content into a user's perception of the physical space surrounding the user. The computer-generated content may include labels, textual information, images, sprites, and three-dimensional entities. In some implementations, the content is inserted for entertainment, educational, or informational purposes.

An example AR system is a portable electronic device, such as a smartphone, that includes a camera and a display device. The portable electronic device may capture images using the camera and show AR images on the display device that include computer-generated content overlaid upon the images captured by the camera.

Another example AR system includes a head-mounted display (HMD) that is worn by a user. The HMD includes a display device that is positioned in front of a user's eyes. For example, the HMD may occlude the user's entire field of view so that the user can only see the content displayed by the display device. In some examples, the display device is configured to display two different images, one that is viewable by each of the user's eyes. For example, at least some of the content in one of the images may be slightly offset relative to the same content in the other image so as to generate the perception of a three-dimensional scene due to parallax. In some implementations, the HMD includes a chamber in which a portable electronic device, such as a smartphone, may be placed so as to permit viewing of the display device of the portable electronic device through the HMD.

Another example AR system includes a HMD that permits the user to see the physical space while the HMD is being worn. The HMD may include a micro-display device that displays computer-generated content that is overlaid on the user's field of view. For example, the HMD may include an at least partially transparent visor that includes a combiner that permits light from the physical space to reach the user's eye while also reflecting images displayed by the micro-display device toward the user's eye.

When computer-generated content is inserted into an image, lighting may be applied to the content so that the content more closely matches the rest of the image (e.g., the lighting in the environment surrounding the user). For example, a three-dimensional model may be rendered using light sources or an environmental light map that approximates the light conditions captured in the image.

AR systems may need to refresh images displayed to a user in real time at a high rate, such as 24 frames per second (FPS), 30 FPS, 60 FPS, or another rate. Traditional techniques for determining or estimating lighting in a scene from an image may require so many computations (or processor cycles) that they cannot be performed in an AR system. Some traditional techniques require prior information about the lighting in an environment, which may not be available for many of the environments in which an AR system is used. The techniques described further herein allow for lighting inserted content in a realistic manner without requiring prior knowledge of the environmental lighting while using fewer processor cycles than traditional techniques. Additionally, due to the reduced number of processing cycles required by the techniques described herein, these techniques may allow for inserting content into a captured image/video in a realistic manner while using less power than traditional techniques would require. This reduction in required power to provide lighting for inserted content may be particularly important in AR systems that include battery-operated mobile devices.

An example AR system captures images of the physical space surrounding a user. The system may then determine a location to insert content. For example, the system may receive a user input indicating a location on the screen for the content. The content may be placed at the location indicated by the user or at a location on a plane corresponding to a surface such as a floor or the ground that is below the location indicated by the user.

Next, the system may determine one or more regions of the image that correspond to the location. The system may then extract image properties from the one or more regions and use those properties to light the content. For example, the system may extract a brightness (or luminosity) value from one of the regions, scale the extracted brightness value, and use the scaled brightness value as a brightness property for an overhead lighting source. The system may also extract a brightness (or luminosity) value from another of the regions, scale the extracted brightness value, and use the scaled brightness value as a brightness property for a lower light source. In some implementations, the brightness value for the upper light source is scaled by a larger scalar value than the brightness for the lower light source.

In some implementations, other properties, such as hue and saturation, are also extracted from the one or more regions. These properties may be modified (e.g., scaled, partially desaturated) and then used as one or more properties of the upper and/or lower light sources too.

In some implementations, the size of the image regions from which properties are extracted or how the extracted properties are modified is based on the inserted content. For example, the inserted content may be associated with data values (or a data structure) that identify one or more region sizes (e.g., pixel dimensions or scalar values relative to the size of the inserted content), scaling values, or desaturation values to use in generating light sources for the entity. The lighted content may then be presented to the user (e.g., overlaid on a captured image of the physical space surrounding the user, projected/displayed on an optical combiner disposed within the user's field of view, etc.).

Although many examples described herein relate to AR systems inserting visual content into an AR environment, content may be inserted using the techniques described herein in other systems too. For example, the techniques described herein may be used to insert content into an image or video.

FIG. 1 is a block diagram illustrating a system 100 according to an example implementation. The system 100 generates an augmented reality (AR) environment for a user of the system 100. In some implementations, the system 100 includes a computing device 102, a head-mounted display device (HMD) 104, and an AR content source 106. Also shown is a network 108 over which the computing device 102 may communicate with the AR content source 106.

The computing device 102 may include a memory 110, a processor assembly 112, a communication module 114, a sensor system 116, and a display device 118. The memory 110 may include an AR application 120, AR content 122, an image buffer 124, an image analyzer 126, a lighting engine 128, and a render engine 130. The computing device 102 may also include various user input components (not shown) such as a controller that communicates with the computing device 102 using a wireless communications protocol. In some implementations, the computing device 102 is a mobile device (e.g., a smart phone) which may be configured to provide or output AR content to a user via the HMD 104. For example, the computing device 102 and the HMD 104 may communicate via a wired connection (e.g., a Universal Serial Bus (USB) cable) or via a wireless communication protocol (e.g., any WiFi protocol, any BlueTooth protocol, Zigbee, etc.). Additionally or alternatively, the computing device 102 is a component of the HMD 104 and may be contained within a housing of the HMD 104.

The memory 110 can include one or more non-transitory computer-readable storage media. The memory 110 may store instructions and data that are usable to generate an AR environment for a user.

The processor assembly 112 includes one or more devices that are capable of executing instructions, such as instructions stored by the memory 110, to perform various tasks associated with generating an AR environment. For example, the processor assembly 112 may include a central processing unit (CPU) and/or a graphics processor unit (GPU). For example, if a GPU is present, some image/video rendering tasks, such as shading content based on determined at least one lighting parameter, may be offloaded from the CPU to the GPU.

The communication module 114 includes one or more devices for communicating with other computing devices, such as the AR content source 106. The communication module 114 may communicate via wireless or wired networks, such as the network 108.

The sensor system 116 may include various sensors, such as a camera assembly 132. Implementations of the sensor system 116 may also include other sensors, including, for example, an inertial motion unit (IMU) 134, a light sensor, an audio sensor, an image sensor, a distance and/or proximity sensor, a contact sensor such as a capacitive sensor, a timer, and/or other sensors and/or different combination(s) of sensors.

The IMU 134 detects motion, movement, and/or acceleration of the computing device 102 and/or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to detect and track the user's gaze direction and head movement.

In some implementations, the AR application may use the sensor system 116 to determine a location and orientation of a user within a physical space and/or to recognize features or objects within the physical space.

The camera assembly 132 captures images and/or videos of the physical space around the computing device 102. The camera assembly 132 may include one or more cameras. The camera assembly 132 may also include an infrared camera.

The AR application 120 may present or provide the AR content to a user via the HMD and/or one or more output devices of the computing device 102 such as the display device 118, speakers, and/or other output devices. In some implementations, the AR application 120 includes instructions stored in the memory 110 that, when executed by the processor assembly 112, cause the processor assembly 112 to perform the operations described herein. For example, the AR application 120 may generate and present an AR environment to the user based on, for example, AR content, such as the AR content 122 and/or AR content received from the AR content source 106. The AR content 122 may include content such as images or videos that may be displayed on a portion of the user's field of view in the HMD 104. The AR environment may also include at least a portion of the physical (real-world) environment and physical (real-world) entities. For example, the content may be generated with lighting that substantially matches the physical space in which the user is located. The content may include objects that overlay various portions of the physical space. The content may be rendered as flat images or as three-dimensional (3D) objects. The 3D objects may include one or more objects represented as polygonal meshes. The polygonal meshes may be associated with various surface textures, such as colors and images. The polygonal meshes may be shaded based on one or more various lighting parameters.

The AR application 120 may use the image buffer 124, image analyzer 126, lighting engine 128, and render engine 130 to generate images for display via the HMD 104 based on the AR content 122. For example, one or more images captured by the camera assembly 132 may be stored in the image buffer 124. The AR application 120 may determine a location to insert content. For example, the AR application may prompt a user to identify a location for inserting the content and may then receive a user input indicating a location on the screen for the content. The AR application may determine the location of the inserted content based on that user input. For example, the location for the content to be inserted may be the location indicated by the user. In some implementations, the location is determined by mapping the location indicated by the user to a plane corresponding to a surface such as a floor or the ground in the image (e.g., by finding a location on the plane that is below the location indicated by the user). The location may also be determined based on a location that was determined for the content in a previous image captured by the camera assembly (e.g., the AR application may cause the content to move across a surface that is identified within the physical space captured in the image).

The image analyzer 126 may then identify a region of the image stored in the image buffer 124 based on the determined location. In some implementations, the size or shape of the region is based on the inserted content. For example, the size of the region may be based on a screen-projected size or the size of the area the inserted content overlays as projected onto the AR display. For example, if the inserted content is shrunk or expanded (e.g., based on user input), the size of the identified region may shrink or expand correspondingly. Similarly, as the inserted content is positioned closer or further away from the user, the portion of the image that the inserted content overlays may increase or decrease. In this situation, the size of the identified region may increase or decrease in proportion to the change in the size of the region of the image that the inserted content overlays. The size of the region may also be determined, at least in part, based on a data value associated with the inserted content. The data value may, for example, specify the region size in absolute terms (e.g., pixel dimensions) or relative terms (e.g., a scalar value to be applied to the size of the overlay). The data value may be retrieved from a data structure associated with the inserted content and may be a component of the AR content 122.

The image analyzer 126 may then determine one or more properties, such as brightness (or luminosity), hue, and saturation, of the region. In some implementations, the image analyzer 126 filters the image to determine the properties. For example, the image analyzer 126 may apply a mipmap filter (e.g., a trilinear mipmap filter) to the image to generate a sequence of lower-resolution representations of the image. The image analyzer 126 may identify a lower resolution representation of the image in which a single pixel or a small number of pixels correspond to the region. The properties of the region can then be determined from the single pixel or the small number of pixels. Alternatively, the properties of the region may be determined by averaging some (e.g., a random sample) or all of the pixels in the region. The lighting engine 128 may then generate one or more light sources or environment maps based on the determined properties. The light sources or environment maps can be used by the render engine 130 to render the inserted content or an augmented image that includes the inserted content. In some implementations, data values associated with the inserted content are used to modify the determined properties. For example, a data value associated with the inserted content may specify a scalar value to use to adjust an extracted saturation value, an extracted hue value, or an extracted brightness value.

In some implementations, a data value (e.g., a scalar value) can include a local-darkening scalar value. This scalar value can constrain the minimum brightness that a model can return as follows: the minimum returned brightness is interpolated from black to the average brightness over the entire image, based on the local darkening scalar. A value of 1.0 for this scalar allows a model to return black, while 0.0 forces the model to return at least the average brightness of the camera feed (for brighter regions, the model can exceed the minimum). This scalar (ranging from 0.0 to 1.0) can be specified per inserted object, allowing it to maintain consistently bright lighting without appearing to glow in the dark when placed in a uniformly dark scene.

In some implementations, the image buffer 124 is a region of the memory 110 that is configured to store one or more images. In some implementations, the computing device 102 stores images captured by the camera assembly 132 as a texture within the image buffer 124. Alternatively or additionally, the image buffer may also include a memory location that is integral with the processor assembly 112, such as dedicated random access memory (RAM) on a GPU.

In some implementations, the image analyzer 126, lighting engine 128, and render engine 130 may include instructions stored in the memory 110 that, when executed by the processor assembly 112, cause the processor assembly 112 to perform operations described herein to generate an image or series images that are displayed to the user (e.g., via the HMD 104).

The AR application 120 may update the AR environment based on input received from the camera assembly 132, the IMU 134, and/or other components of the sensor system 116. For example, the IMU 134 may detect motion, movement, and/or acceleration of the computing device 102 and/or the HMD 104. The IMU 134 may include various different types of sensors such as, for example, an accelerometer, a gyroscope, a magnetometer, and other such sensors. A position and orientation of the HMD 104 may be detected and tracked based on data provided by the sensors included in the IMU 134. The detected position and orientation of the HMD 104 may allow the system to, in turn, detect and track the user's position and orientation within a physical space. Based on the detected position and orientation, the AR application 120 may update the AR environment to reflect a changed orientation and/or position of the user within the environment.

Although the computing device 102 and the HMD 104 are shown as separate devices in FIG. 1, in some implementations, the computing device 102 may include the HMD 104. In some implementations, the computing device 102 communicates with the HMD 104 via a cable, as shown in FIG. 1. For example, the computing device 102 may transmit video signals and/or audio signals to the HMD 104 for display for the user, and the HMD 104 may transmit motion, position, and/or orientation information to the computing device 102.

The AR content source 106 may generate and output AR content, which may be distributed or sent to one or more computing devices, such as the computing device 102, via the network 108. In an example implementation, the AR content includes three-dimensional scenes and/or images. Additionally, the AR content may include audio/video signals that are streamed or distributed to one or more computing devices. The AR content may also include an AR application that runs on the computing device 102 to generate 3D scenes, audio signals, and/or video signals.

The network 108 may be the Internet, a local area network (LAN), a wireless local area network (WLAN), and/or any other network. A computing device 102, for example, may receive the audio/video signals, which may be provided as part of AR content in an illustrative example implementation, via the network.

Figure 2:
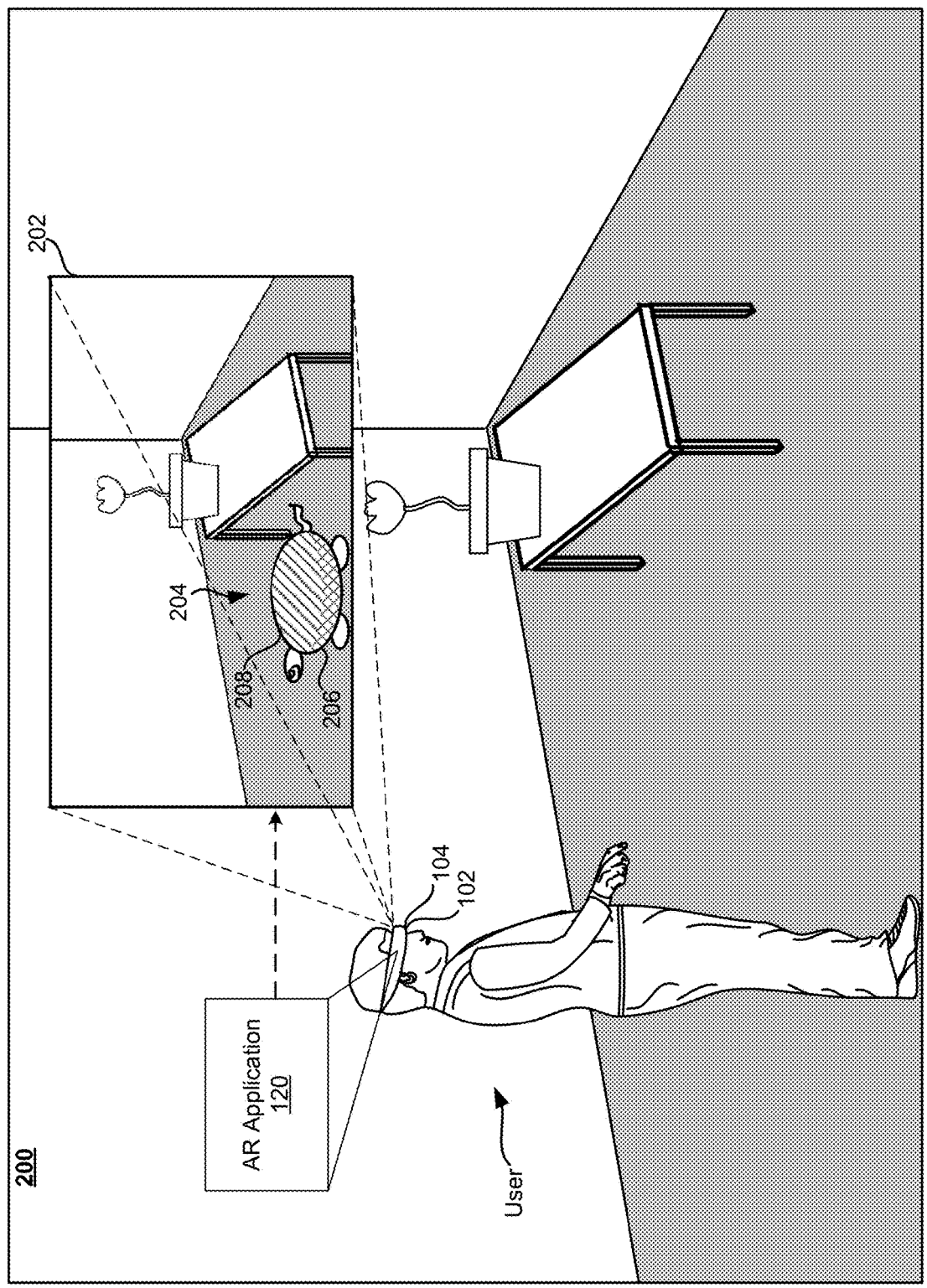
FIG. 2 is a third person view of an example physical space, in which a user is experiencing an AR environment through the example HMD of FIG. 1.

FIG. 2 is a third person view of an example physical space 200, in which a user is experiencing an AR environment 202 through the example HMD 104. The AR environment 202 is generated by the AR application 120 of the computing device 102 and displayed to the user through the HMD 104.

The AR environment 202 includes inserted content 204 that is displayed over an image of the physical space 200. In this example, the content 204 is a turtle that includes a lower shaded region 206 and an upper shaded region 208. The lower shaded region 206 may be shaded based on a lower light source determined, for example, by the lighting engine 128. Similarly, the upper shaded region 208 may be shaded based on an upper light source determined, for example, by the lighting engine 128. The lower shaded region 206 may include a region of the inserted content 204 with surface normal vectors (also referred to as surface normals) that are directed downward (i.e., the vertical component of the surface normal vector is less than zero) and the upper shaded region 208 may include a region of the inserted content 204 with surface normals that are directed upward (i.e., the vertical component of the surface normal vector is greater than zero).

In some implementations, the AR environment 202 is provided to the user as a single image or a pair of stereoscopic images that occupy substantially all of the user's field of view and are displayed to the user via the HMD 104. In other implementations, the AR environment is provided to the user by displaying/projecting the inserted content 204 on an at least partly transparent combiner that occupies at least a portion of the user's field of view. For example, portions of the HMD 104 may be transparent, and the user may be able to see the physical space 200 through those portions while the HMD 104 is being worn.

FIGS. 3A and 3B are perspective views of an example HMD 300, such as, for example, the HMD 104 worn by the user in FIG. 2, and FIG. 3C illustrates an example handheld electronic device 302 for controlling and/or interacting with the HMD 300.

The handheld electronic device 302 may include a housing 303 in which internal components of the device 302 are received, and a user interface 304 on an outside of the housing 303, accessible to the user. The user interface 304 may include a touch sensitive surface 306 configured to receive user touch inputs. The user interface 304 may also include other components for manipulation by the user such as, for example, actuation buttons, knobs, joysticks and the like. In some implementations, at least a portion of the user interface 304 may be configured as a touchscreen, with that portion of the user interface 304 being configured to display user interface items to the user, and also to receive touch inputs from the user on the touch sensitive surface 306. The handheld electronic device 302 may also include a light source 308 configured to selectively emit light, for example, a beam or ray, through a port in the housing 303, for example, in response to a user input received at the user interface 304.

The HMD 300 may include a housing 310 coupled to a frame 320, with an audio output device 330 including, for example, speakers mounted in headphones, also being coupled to the frame 320. In FIG. 3B, a front portion 310a of the housing 310 is rotated away from a base portion 310b of the housing 310 so that some of the components received in the housing 310 are visible. A display 340 may be mounted on an interior facing side of the front portion 310a of the housing 310. Lenses 350 may be mounted in the housing 310, between the user's eyes and the display 340 when the front portion 310a is in the closed position against the base portion 310b of the housing 310. In some implementations, the HMD 300 may include a sensing system 360 including various sensors and a control system 370 including a processor 390 and various control system devices to facilitate operation of the HMD 300.

In some implementations, the HMD 300 may include a camera 380 to capture still and moving images. The images captured by the camera 380 may be used to help track a physical position of the user and/or the handheld electronic device 302 in the real world, or physical space relative to the augmented environment, and/or may be displayed to the user on the display 340 in a pass through mode, allowing the user to temporarily leave the augmented environment and return to the physical environment without removing the HMD 300 or otherwise changing the configuration of the HMD 300 to move the housing 310 out of the line of sight of the user.

For example, in some implementations, the sensing system 360 may include an inertial measurement unit (IMU) 362 including various different types of sensors such as, for example, an accelerometer, a gyroscope, a magnetometer, and other such sensors. A position and orientation of the HMD 300 may be detected and tracked based on data provided by the sensors included in the IMU 362. The detected position and orientation of the HMD 300 may allow the system to detect and track the user's head gaze direction and movement.

In some implementations, the HMD 300 may include a gaze tracking device 365 to detect and track an eye gaze of the user. The gaze tracking device 365 may include, for example, an image sensor 365A, or multiple image sensors 365A, to capture images of the user's eyes, for example, a particular portion of the user's eyes, such as, for example, the pupil, to detect, and track direction and movement of, the user's gaze. In some implementations, the HMD 300 may be configured so that the detected gaze is processed as a user input to be translated into a corresponding interaction in the immersive virtual experience.

In some implementations, the HMD 300 includes a portable electronic device, such as a smartphone, that is removably disposed within a chamber of the housing 310. For example, the display 340 and the camera 380 may be provided by the portable electronic device. When the chamber is closed (as shown in FIG. 3A), the display 340 is aligned with the lenses 350 so that a user can view at least a portion of the display 340 (provided by the portable electronic device) through each eye. The camera 380 may align with an aperture in the housing 310 so that the portable electronic device of the HMD 300 can capture images while disposed in the housing 310.

Figure 4:
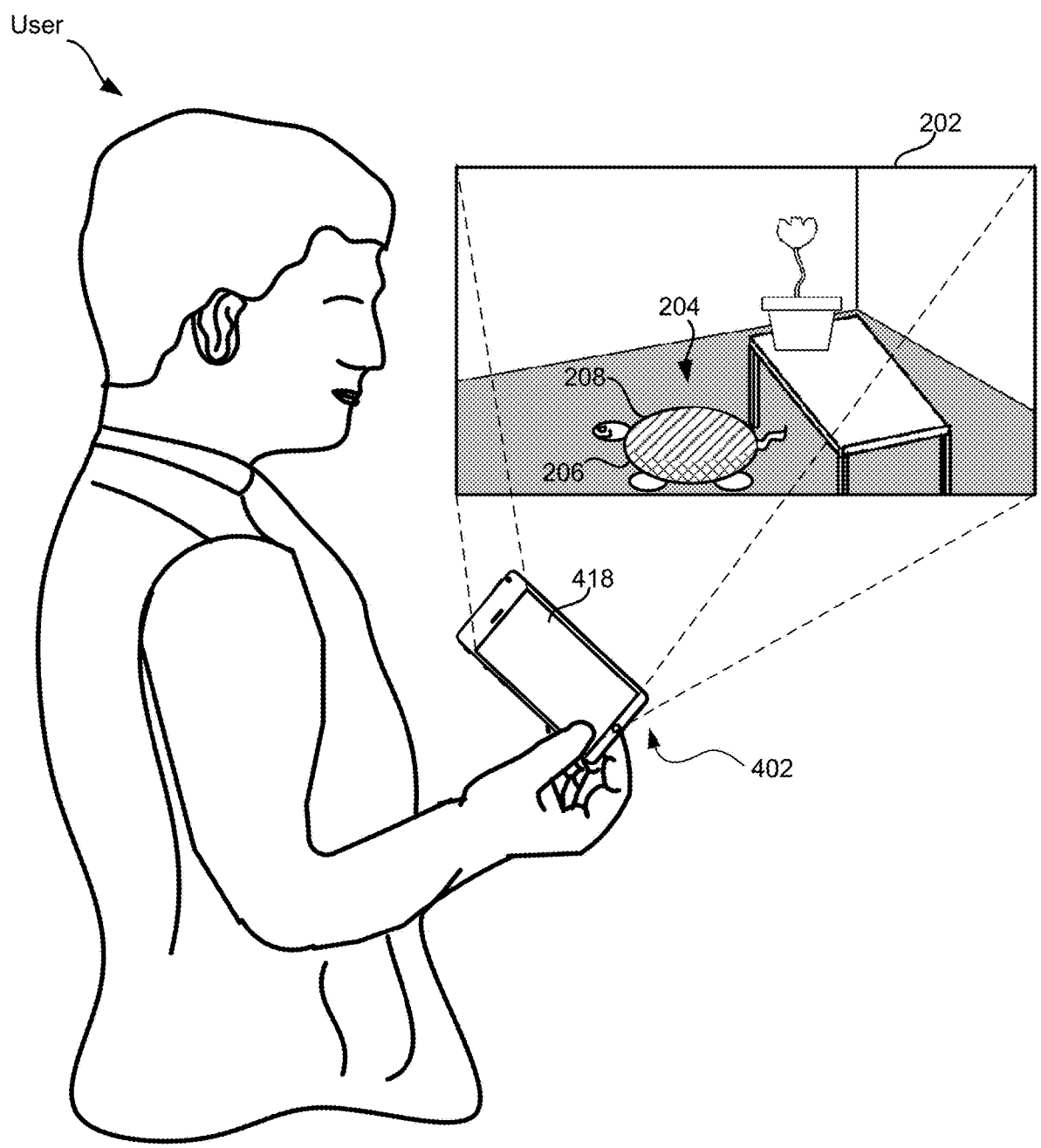
FIG. 4 is a schematic view of a user experiencing the AR environment via an example portable electronic device.

FIG. 4 is a schematic view of a user experiencing the AR environment 202 via an example portable electronic device 402. The portable electronic device 402 is an example of the computing device 102. The portable electronic device 402 may be a smartphone, a tablet, or another type of portable computing device. In this example, the user is experience the AR environment through a display device 418 of the portable electronic device. For example, the display device 418 may include a screen that can show images and/or videos.

Figure 5:
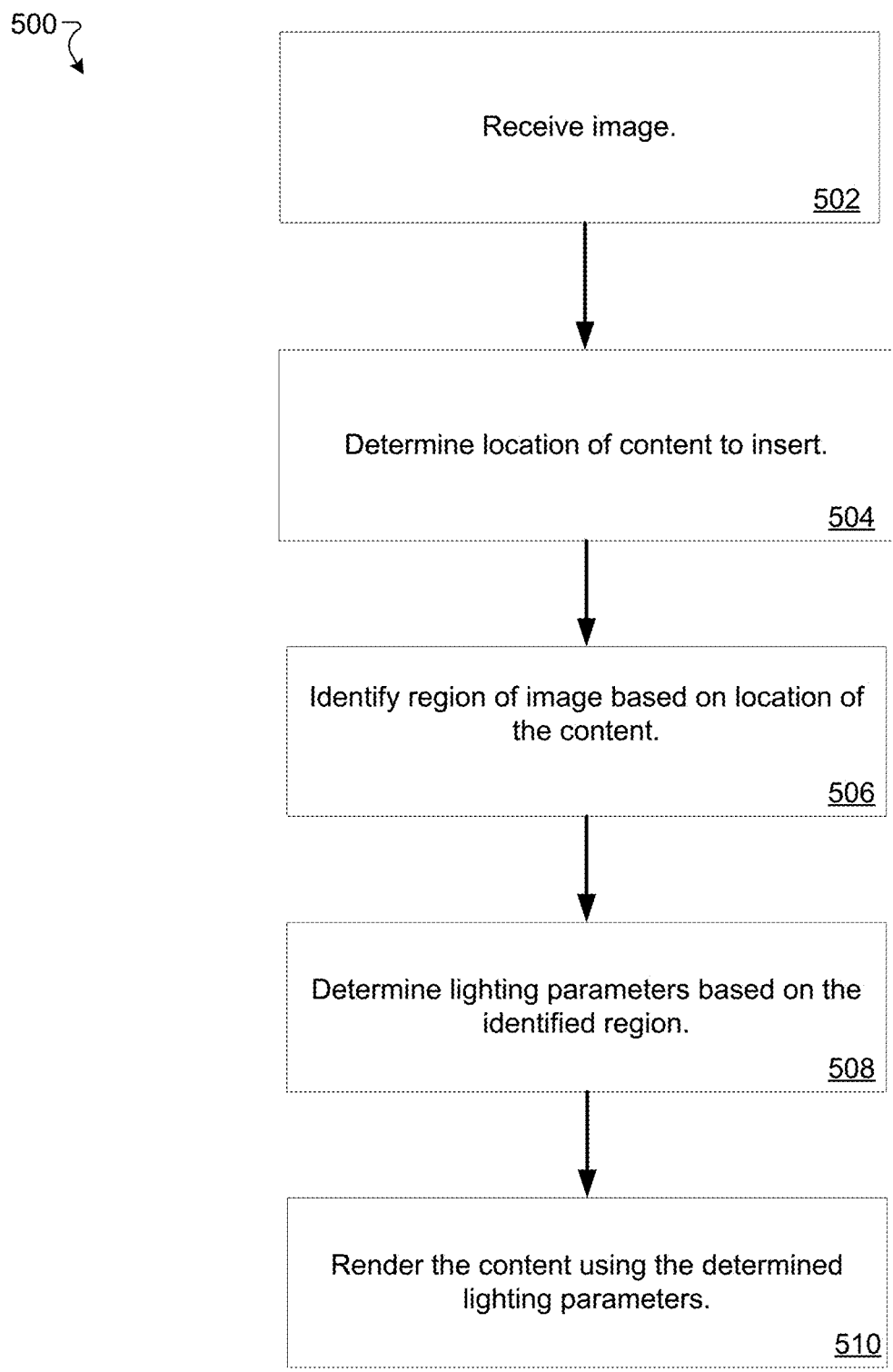
FIG. 5 is a diagram of an example method of inserting content, in accordance with implementations described herein.

FIG. 5 is a diagram of an example method 500 of inserting content, in accordance with implementations described herein. This method 500 may for example be performed by the computing device 102 to provide an AR environment for a user.

At operation 502, an image is received. Receiving the image may include capturing the image with a camera assembly, such as the camera assembly 132. In some implementations, receiving the image may include accessing a previously captured image that is stored in a memory location. An image may also be received from another computing device, such as a server that is accessible via a network.

At operation 504, a location of content to be inserted is determined. In some implementations, the content to be inserted is AR content. In at least some implementations, the content includes one or more three-dimensional models, such as polygonal meshes. The location of the content to be inserted may, for example, be determined by identifying substantially planar surfaces in the received image and positioning the content on an identified surface (e.g., a surface that may correspond to the ground or a floor). The location of the content to be inserted may also be determined at least in part by user input. For example, the user may identify a location within an image to insert content. In some implementations, the content may be placed at a location on a horizontal plane that corresponds to the location identified by the user (e.g., a location below the position identified by the user so the content is positioned on the plane). The location of the content may also be determined based on the location of the content in a previous image (i.e., a previous frame of a video captured by the camera assembly). For example, the content may move around relative to the physical space.

At operation 506, a region of the image is identified based on the determined location of the content to be inserted. In some implementations, the content at the determined location is projected onto the image plane. Additionally or alternatively, a bounding box surrounding the content (or a portion of the content) may be projected onto the image plane. As described previously, the size of the region may be based on the size of the inserted content and/or a data value associated with the inserted content.

In some implementations, multiple regions are identified based on the determined location of the content. For example, as described further below, multiple lighting parameters may be determined, such as one or more upper lighting parameters and one or more lower lighting parameters. In some implementations, different regions are identified and used to determine the one or more upper lighting parameters and the one or more lower lighting parameters. For example, the lower lighting parameters may be based on a smaller region than the upper lighting parameters.

At operation 508, lighting parameters are determined based on the identified region. For example, a brightness (or luminosity) value may be determined for the identified region. If the image is represented in the red-green-blue (RGB) color space or a similar color space, the image may be converted to a luminance plus chrominance color space. Alternatively, RGB pixel values may be individually converted to brightness values as needed. The brightness value may be determined by averaging the brightness values of pixels within the region, by sampling (e.g., randomly) pixels from with the region, or by filtering (e.g., downsampling) the region. In some implementations, a pixel value can include a color of a pixel.

In some implementations, the image is processed with a mipmap filter to generate a sequence of representations of the image at progressively lower resolutions. The brightness value of the region may then be determined by identifying a representation generated by the mipmap filter in which one (or a small number) of pixels corresponds to the identified region and retrieving/combining the brightness value of the corresponding pixel or pixels.

In some implementations, determining lighting parameters also includes determining hue and/or saturation values for the identified regions. The hue and/or saturation values can be determined in a manner similar to how the brightness value is determined for the identified region.

The determined lighting parameters may be scaled or otherwise adjusted. For example, the brightness value of the determined lighting parameters may be a multiple of the brightness value determined from the region. In some implementations, the multiple is 5.5. The multiple may be selected from a range of 4-7, or a range of 2-8, or another range. Increasing the brightness value of the determined lighting parameters by scaling the brightness value determined from the image, may offset a darkening caused by the surface captured in the image (e.g., an image of a floor will typically be much darker than the light source that is illuminating that floor). Similarly, the saturation value may be scaled to desaturate the chrominance (i.e., reduce the saturation value) as a significant portion of the chrominance extracted from the region of the image is likely attributable to the color of the object or objects shown in the region of the image rather than the light source. In some implementations, the saturation value for the lighting parameters is equal to the determined saturation value from the identified region multiplied by 0.2.

Additionally, multiple sets of lighting parameters may be determined. For example, upper lighting parameters and lower lighting parameters may be determined. In one implementation, the upper lighting parameters are determined by multiplying the determined brightness value by 5.5 and multiplying the determined saturation value by 0.2, and the lower lighting parameters are the determined brightness and saturation values from the region of the image. The lower lighting parameters may more accurately represent the properties of light reflected onto the lower portions of the inserted content, which are unlikely to be lit directly by a light source in the physical space. Additionally, as noted above, multiple regions may be identified in some implementations. In these implementations, the lower lighting parameters may be determined from a different region than the upper lighting parameters.

In some implementations, the multiple (or scalar value) used to adjust the brightness value extracted from a region of the image is determined at least in part based on the inserted content (e.g., a data value associated with the inserted content may specify the multiple or may specify an additional scalar value to apply to the multiple. In some implementations, inserted content is associated with a data structure that specifies multiple scalar values. For example, the data structure may specify scalar values that are used to adjust the size of a region for determining upper lighting parameters, to adjust the size of a region for determining lower lighting parameters, and to determine multiples (or scalar values) to adjust extracted brightness, hue, or saturation values.

At operation 510, the content is rendered using the determined lighting parameters. For example, three-dimensional content may be rendered using one or more light sources based on the determined lighting parameters. For example, a single upper (overhead) point light source may be used to render the inserted content. That light source may be defined by the parameters determined by operation 508. In some implementations, multiple overhead light sources are used, such as a first overhead light source that is tilted toward the user and a second overhead light source that is tilted away from the user. Additionally, one or more lower light sources are included in at least some implementations.

In some implementations, the content is rendered using an environment map rather than individual light sources. For example, an environment map may define lighting parameters based on normal directions of surfaces of the three-dimensional content. The environment may provide the lower lighting parameters for surfaces with downward directed normal vectors and the upper lighting parameters for surfaces with upward directed normal vectors. The environment map may provide lighting parameters that blend the upper and lower lighting parameters for surfaces that have normal vectors that are between up and down. In some implementations, parts of the environment map corresponding to illumination from above are scaled by the upper lighting parameters and parts corresponding to illumination from below are scaled by the lower lighting parameters. For example, the scaling factors used may be blended smoothly between these values across the height of the environment map, resulting in a continuous adjustment. In some implementations, a continuous function (for continuous adjustment) can be determined based on an elevation angle of a light vector. This function can incorporate at least light color from above and light color from below, returning a multiplier to be applied to the color obtained from the environment/cube map(s) queried at the light vector. In some implementations, the details of this scalar-to-color function can be dependent (e.g., highly dependent) on the type of image-based lighting being used.

Once the inserted content is rendered, the content can be added to the image received at operation 502 to generate an augmented image. The augmented image may then be displayed to the user to provide an augmented environment. Additionally, rendered content may be projected onto a transparent combiner surface where it will be shown over a user's field of view of the physical space.

Figure 6:
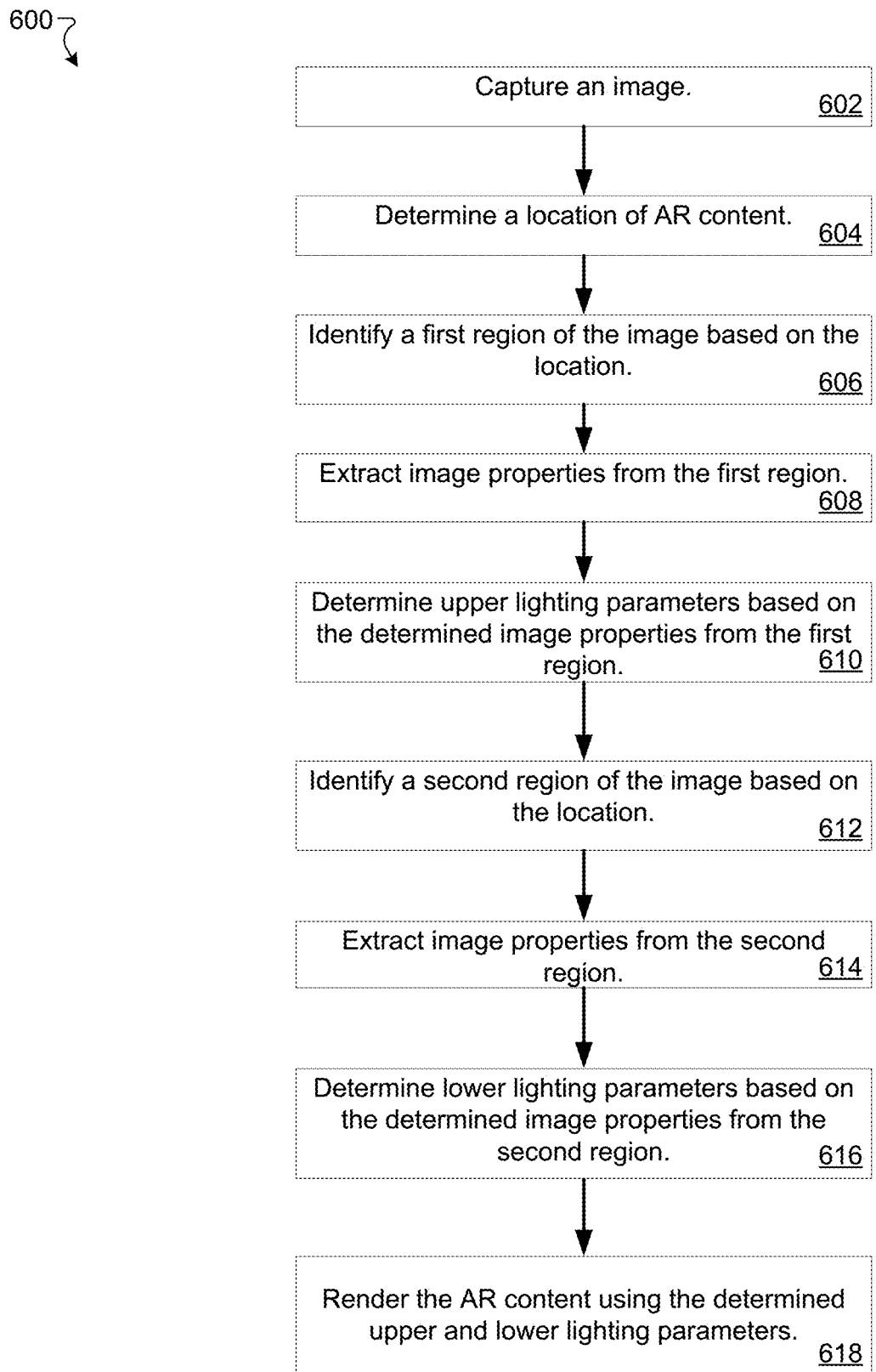
FIG. 6 is a diagram of an example method of inserting content, in accordance with implementations described herein.

FIG. 6 is a diagram of an example method 600 of inserting content, in accordance with implementations described herein. This method 600 may for example be performed by the computing device 102 to provide an AR environment for a user.

Figure 7A:
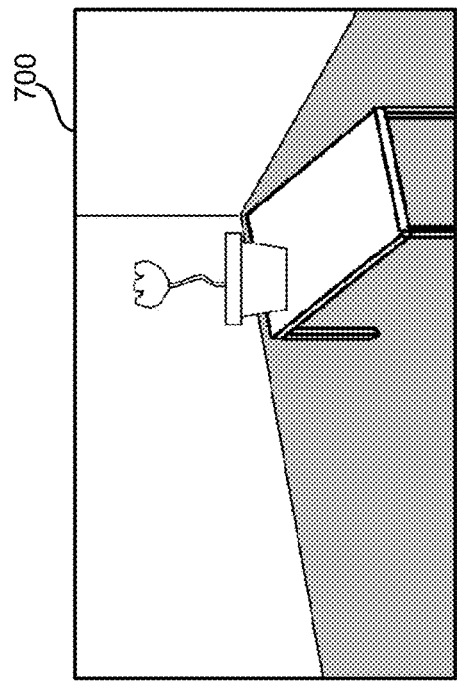
FIGS. 7A-7D are schematic diagrams of steps of inserting content in accordance with implementations as described herein.

At operation 602, an image is captured. For example, the image may be captured by a camera assembly of a computing device, such as the computing device 102. The captured image may be stored as a texture in the image buffer 124. An example image 700 is shown in FIG. 7A.

Figure 7B:
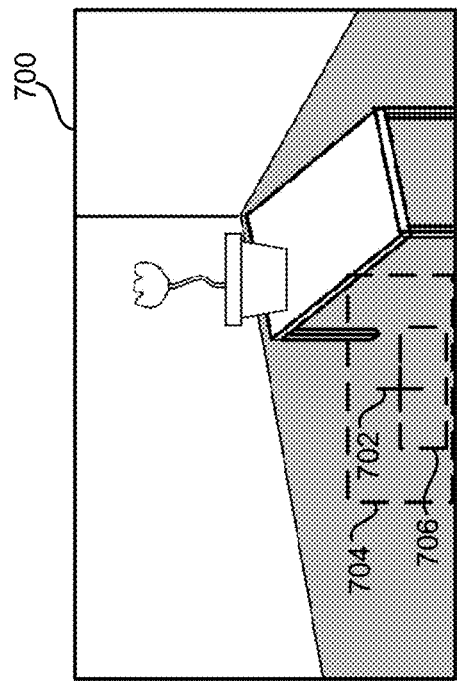

At operation 604, a location is determined for AR content that will be inserted. As described above, the location may be determined in various ways, such as based on user input, by identifying a planar surface corresponding to the ground or a floor, and/or a location of the content in a previous image. An example location 702 (illustrated by a vertical line that intersect a point on a floor) is shown in FIG. 7B.

At operation 606, a first region of the image is identified based on the location of the AR content. For example, the first region may be identified by projecting a bounding box of the AR content onto the image plane. The size of the first region may be based on the size of the inserted content and/or a data value associated with the inserted content. An example first region 704 is shown in FIG. 7B.

Figure 7C:
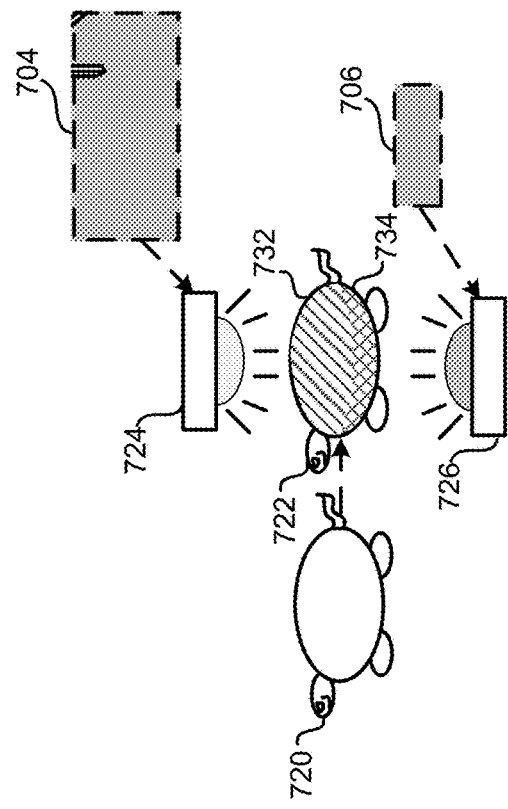

At operation 608, image properties are extracted from the first region. For example, hue, saturation, and brightness values may be extracted from the first region (or a lower-resolution representation of the first region). At operation 610, upper lighting parameters are determined from the image properties extracted from the first region. For example, the upper lighting parameters may be determined by scaling (or otherwise modifying) the image properties extracted from the first region. In some implementations, the upper lighting parameters are based on multiplying the extracted brightness by 5.5 and multiplying the extracted saturation by 0.2. The scalar values used to adjust the extracted brightness and extracted saturation may be based on data values associated with the inserted content. Thus, different types of inserted content may result in different scalar values for adjusting the extracted brightness or saturation. FIG. 7C shows an example upper light source 724, which uses upper lighting parameters that are determined based on the image properties extracted from the first region 704.

At operation 612, a second region of the image is identified based on the location of the AR content. For example, the second region may be identified by projecting a portion of a bounding box of the AR content onto the image plane. The second region may be smaller than the first region (e.g., the second region may be a portion of the first region). The size of the second region may be based on the size of the inserted content and/or a data value associated with the inserted content. The second region may be a portion of the first region disposed in the lower half of the first region. An example second region 706 is shown in FIG. 7B.

At operation 614, image properties are extracted from the second region. For example, hue, saturation, and brightness values may be extracted from the second region (or a lower-resolution representation of the second region). At operation 616, lower lighting parameters are determined from the image properties extracted from the second region. For example, the image properties extracted from the second region may be used directly as the lower lighting parameters. In some implementations, the lower lighting parameters may be determined by scaling (or otherwise altering) the image properties extracted from the second region. Similar to the first region, the scalar values used to adjust the extracted brightness and extracted saturation from the second region may be based on data values associated with the inserted content. FIG. 7C shows an example lower light source 726, which uses lower lighting parameters that are determined based on the image properties extracted from the second region 706.

At operation 618, the AR content is rendered using the determined upper and lower lighting parameters. Rendering the AR content using the determined upper and lower lighting parameters may include shading the AR content using an upper light source that is based on the upper lighting parameters and a lower light source that is based on the lower lighting parameters. FIG. 7C shows an example of AR content 720 (before shading) and AR content 722 (after shading). The AR content 722 includes a shaded region 732 that is primarily lit by the upper light source 724 and a shaded region 734 that is primarily lit by the lower light source 726.

Figure 7D:
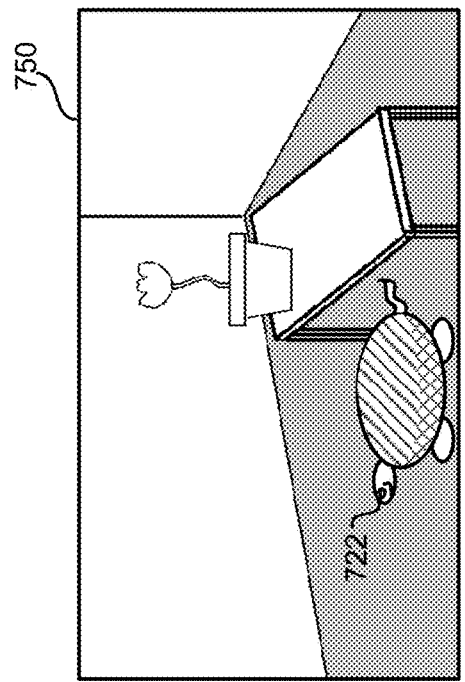

After the AR content is rendered, the AR content can be added to the image captured at operation 602 to generate an augmented image. An example augmented image 750 that includes the shaded AR content 722 is shown in FIG. 7D.

Figure 8:
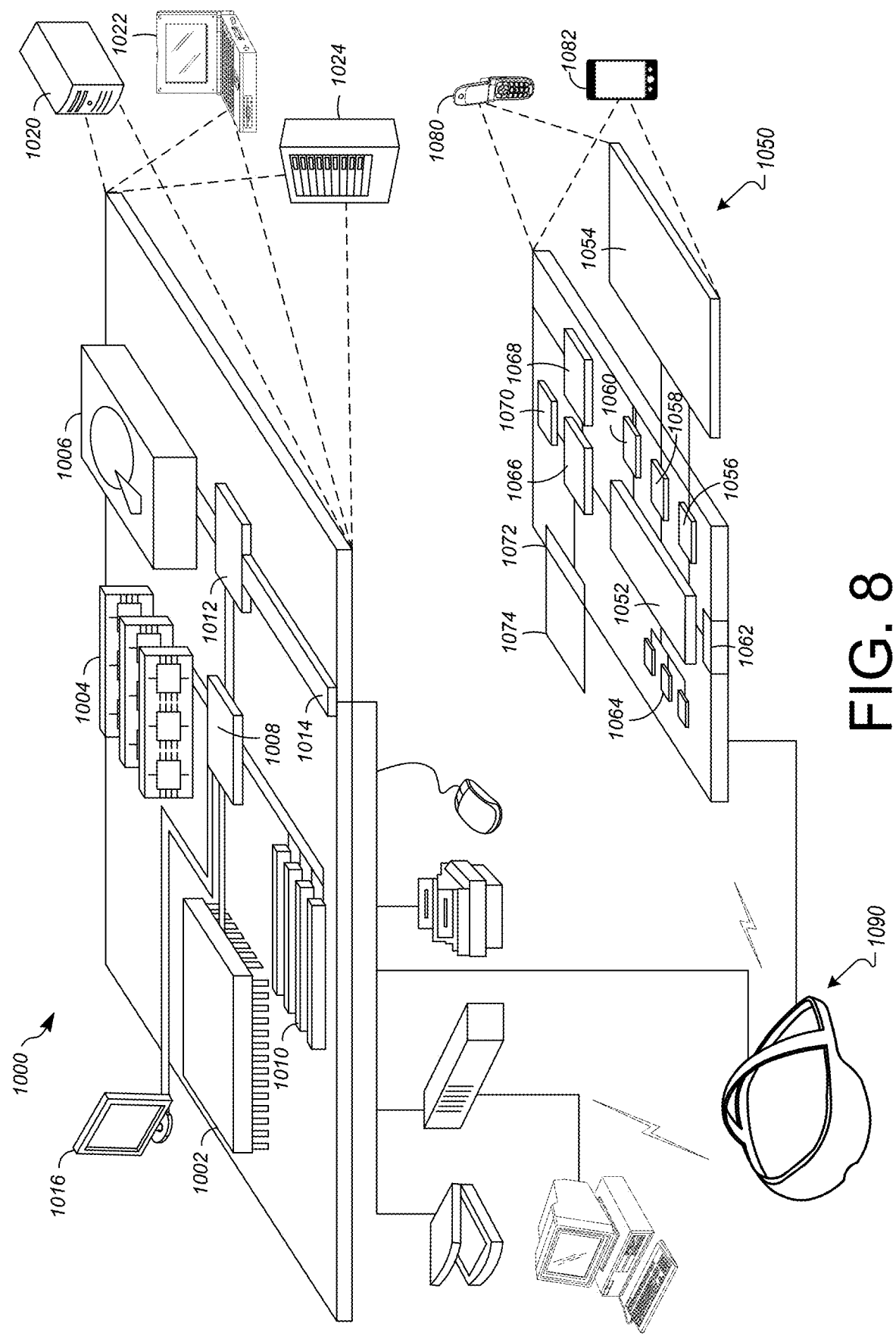
FIG. 8 shows an example of a computer device and a mobile computer device that can be used to implement the techniques described herein.

FIG. 8 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 8 can include sensors that interface with an AR headset/HMD device 1090 to generate an augmented environment for viewing inserted content within the physical space. For example, one or more sensors included on a computing device 1050 or other computing device depicted in FIG. 8, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. In the example of the laser pointer in a AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090.

In some implementations, a computing device 1050 may include a touchscreen. For example, a user can interact with the touchscreen in a particular manner that can mimic what happens on the touchscreen with what happens in the AR space. For example, a user may use a pinching-type motion to zoom content displayed on the touchscreen. This pinching-type motion on the touchscreen can cause information provided in the AR space to be zoomed. In another example, the computing device may be rendered as a virtual book in a computer-generated, 3D environment. In the AR space, the pages of the book can be displayed in the AR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR space to control objects in the AR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
    determining a location within an image to insert content based on identifying a representation of a surface within the image, the content associated with a data structure that includes one or more scaling values for lighting parameters with each of the scaling values associated with a particular of lighting characteristic;
    identifying a first region of the image and a second region of the image based on the determined location to insert the content to determine at least one upper lighting parameter and at least one lower lighting parameter, the second region being different than the first region;
    extracting image properties from the identified first region by applying a filter to the identified first region and determining the at least one upper lighting parameter based on the extracted image properties from the identified first region;
    extracting image properties from the identified second region by applying a filter to the identified second region and determining the at least one lower lighting parameter based on the extracted image properties from the identified second region;
    scaling the determined at least one upper lighting parameter and the at least one lower lighting parameter by applying the one or more scaling values from the data structure associated with the content to the particular lighting characteristic;
    rendering an upper surface region of the content using the determined at least one upper lighting parameter and rendering a lower surface region of the content using the determined at least one lower lighting parameter, wherein the determined at least on upper lighting parameter is different from the determined at least one lower lighting parameter;
    inserting the rendered content into the image based on the determined location, the identified surface, and dimensions of the identified first region and the identified second region to generate an augmented image; and
    displaying the augmented image.

2. The method of claim 1, wherein the identifying a region of the image based on the determined location comprises projecting the determined location onto an image plane.

3. The method of claim 1, wherein the determining the at least one upper lighting parameter includes:
    determining a brightness value from the filtered first region;
    scaling the determined brightness value; and
    using the scaled brightness value as a brightness parameter of the determined at least one upper lighting parameter.

4. The method of claim 3, wherein the applying a filter to the identified first region includes applying a mipmap filter to the image to generate a mipmap image sequence and wherein the determining a brightness value from the filtered first region includes accessing a pixel corresponding to the first region in a lower-resolution image within the mipmap image sequence.

5. The method of claim 3, wherein the determining the at least one upper lighting parameter further includes:
    determining a hue value from the filtered first region;
    using the hue value as a hue parameter of the at least one upper lighting parameter;
    determining a saturation value from the filtered first region;
    scaling the saturation value; and
    using the scaled saturation value as a saturation parameter of the determined at least one upper lighting parameter.

6. The method of claim 1, wherein the rendering the upper surface region of the content using the determined at least one upper lighting parameter comprises using an overhead light source that emits light based on the determined at least one upper lighting parameter to shade the upper surface region of the content.

7. The method of claim 6, wherein the rendering the lower surface region of the content using the determined at least one lower lighting parameter includes using a lower light source that emits light based on the determined lower lighting parameters to shade the lower surface region of the content.

8. The method of claim 1, wherein the rendering the upper surface region of the content using the determined at least one upper lighting parameter and the rendering the lower surface region of the content using the determined lower lighting parameters includes:
    generating an environment map based on the at least one upper lighting parameter and the at least one lower lighting parameter; and
    shading the content using the environment map.

9. A non-transitory computer-readable storage medium comprising instructions stored thereon that, when executed by at least one processor, are configured to cause a computing system to at least:
    capture an image;
    determine a location within the image to insert content based on identifying a representation of a surface within the image, the content associated with a data structure that includes one or more scaling values for lighting parameters with each of the scaling values associated with a particular lighting characteristic;
    identify a first region of the image based on a projection of the determined location onto an image plane;
    extract first image properties from the identified first region of the image based on applying a filter to the identified first region of the image;
    determine an upper lighting parameter based on the first image properties;
    identify a second region of the image based on a projection of the determined location onto an image plane;
    extract second image properties from the identified second region of the image based on applying a filter to the identified second region of the image;
    determine a lower lighting parameter based on the second image properties;
    scale the determined at least one upper lighting parameter and the at least one lower lighting parameter by applying the one or more scaling values from the data structure associated with the content to the particular lighting characteristic;
    render an upper surface region of the content using the determined at least one upper lighting parameter and a lower surface region of the content using the determined at least one lower lighting parameter, wherein the determined at least one upper lighting parameter is different from the determined at least one lower lighting parameter;

insert the rendered content into the image to generate an augmented image based on the determined location, the identified surface, and dimensions of the identified first region and the identified second region; and display the augmented image.

10. The non-transitory computer-readable storage medium of claim 9, wherein the second region is smaller than the first region in at least one dimension.

11. The non-transitory computer-readable storage medium of claim 10, wherein the second region is a subset of the first region.

12. The non-transitory computer-readable storage medium of claim 9, wherein the first region and the second region are the same.

13. The non-transitory computer-readable storage medium of claim 9, wherein a size of the first region is based on a data value associated with the content.

14. A system comprising:

a camera;

at least one processor; and memory storing instructions that, when executed by the at least one processor, cause the system to:

capture an image;

determine a location within the image to insert content based on identifying a representation of a surface within the image, the content associated with a data structure that includes one or more values for lighting parameters;

identify a first region of the image and a second region of the image based on the determined location to insert the content to determine at least one upper lighting parameter and at least one lower lighting parameter, the second region being different than the first region;

extract image properties from the identified first region by applying a filter to the identified first region and determine the at least one upper lighting parameter based on the extracted image properties from the identified first region;

extract image properties from the identified second region by applying a filter to the identified second region and determining the at least one lower lighting parameter based on the extracted image properties from the identified second region;

scale the determined at least one upper lighting parameter and the at least one lower lighting parameter by applying the one or more scaling values from the data structure associated with the content to the particular lighting characteristic;

render the content using the determined at least one upper lighting parameter to shade an upper surface region of the content and the determined at least one lower lighting parameter to shade a lower surface region of the content, wherein the determined at least one upper lighting parameter is different from the determined at least one lower lighting parameter;

insert the rendered content into the image to generate an augmented image based on the determined location, the identified surface, and dimensions of the identified first region and the identified second region; and cause the augmented image to be displayed.

15. The system of claim 14, wherein the instructions that, when executed by the at least one processor, cause the system to determine the at least one upper lighting parameter based on applying a filter to the identified first region include instructions that cause the system to:

determine a brightness value based on the identified first region; and use the brightness value as a brightness parameter of the at least one upper lighting parameter.

* * * * *